(12) United States Patent
Lin et al.

(10) Patent No.: US 12,178,350 B2
(45) Date of Patent: Dec. 31, 2024

(54) DRIP COFFEE MACHINE COMPATIBLE WITH COFFEE CAPSULES

(71) Applicant: Ningbo Symay Electric Appliance Industry Co., Ltd., Ningbo (CN)

(72) Inventors: Xiangsheng Lin, Ningbo (CN); Xuguang Lu, Ningbo (CN)

( * ) Notice: Subject to any disclaimer, the term of this patent is extended or adjusted under 35 U.S.C. 154(b) by 0 days.

(21) Appl. No.: 18/387,481

(22) Filed: Nov. 7, 2023

(65) Prior Publication Data
US 2024/0358182 A1 Oct. 31, 2024

Related U.S. Application Data (63) Continuation of application No. PCT/CN2023/091001, filed on Apr. 26, 2023.

(30) Foreign Application Priority Data

| Apr. 27, 2022 | (CN) | 202220994860.1 |
| Mar. 10, 2023 | (CN) | 202320451558.6 |
| Mar. 10, 2023 | (CN) | 202320451584.9 |

(51) Int. Cl.
*A47J 31/10* (2006.01)
*A47J 31/06* (2006.01)
(Continued)

(52) U.S. Cl.
CPC ........... *A47J 31/10* (2013.01); *A47J 31/3671* (2013.01); *A47J 31/3676* (2013.01);
(Continued)

(58) Field of Classification Search
CPC .. A47J 31/057; A47J 31/0573; A47J 31/0576; A47J 31/10; A47J 31/103;
(Continued)

(56) References Cited

U.S. PATENT DOCUMENTS

| 2014/0013958 A1* | 1/2014 | Krasne | A47J 31/057 |
| | | | 99/284 |
| 2015/0289709 A1* | 10/2015 | Picozza | A47J 31/4492 |
| | | | 99/280 |

(Continued)

FOREIGN PATENT DOCUMENTS

| CN | 203106806 U | 8/2013 |
| CN | 203302876 U | 11/2013 |

(Continued)

OTHER PUBLICATIONS

CN 217488292 U (Lu, Xu-Guang) Sep. 27, 2022 [retrieved on Dec. 27, 2023]. Retrieved from Foreign Image and Text database, translation by Clarivate Analytics. (Year: 2022).*

*Primary Examiner* — John J Norton
(74) *Attorney, Agent, or Firm* — Hawaii Patent Services; Nathaniel K Fedde; Kenton N. Fedde (57) ABSTRACT

The present application relates to the technical field of coffee machines, and discloses a drip coffee machine compatible with coffee capsules, which comprises a machine body and a machine cover, wherein a bracket assembly is arranged between the machine body and the machine cover, the bracket assembly comprises a first bracket and a second bracket; the first bracket is formed with a first cavity for placing coffee powder; the second bracket is formed with a second cavity for placing coffee capsules or coffee powder; the first cavity is communicated with the second cavity; the second bracket is placed above the first bracket; a first key mechanism and a second key mechanism are arranged between the machine body and the machine cover, wherein the first key mechanism is used for locking/releasing the machine cover, and the second key mechanism is used for locking/releasing the second bracket.

8 Claims, 12 Drawing Sheets

(51) Int. Cl.
*A47J 31/36* (2006.01)
*A47J 31/40* (2006.01)
*A47J 31/44* (2006.01)

(52) U.S. Cl.
CPC ......... *A47J 31/407* (2013.01); *A47J 31/4407* (2013.01); *A47J 31/0642* (2013.01)

(58) Field of Classification Search
CPC ........ A47J 31/106; A47J 3/12; A47J 31/3671; A47J 31/3609; A47J 31/3614; A47J 31/3619; A47J 31/3676–3695; A47J 31/3623–3642
See application file for complete search history.

(56) References Cited

U.S. PATENT DOCUMENTS

| | | | | |
|---|---|---|---|---|
| 2016/0183717 | A1* | 6/2016 | Ostan | A47J 31/24 99/280 |
| 2017/0135514 | A1* | 5/2017 | Caputa | A47J 31/446 |
| 2021/0120999 | A1* | 4/2021 | Anthony | A47J 31/0663 |
| 2022/0338665 | A1* | 10/2022 | Smith | A47J 31/3623 |

FOREIGN PATENT DOCUMENTS

| | | |
|---|---|---|
| CN | 209404476 U | 9/2019 |
| CN | 213962995 U | 8/2021 |
| CN | 215016172 U | 12/2021 |
| CN | 217488292 U | 9/2022 |
| DE | 102019114043 A1 | 11/2020 |
| EP | 2907425 A1 | 8/2015 |

\* cited by examiner

DRIP COFFEE MACHINE COMPATIBLE WITH COFFEE CAPSULES

TECHNICAL FIELD

The present application relates to the technical field of coffee machines, in particular to a drip coffee machine compatible with coffee capsules.

BACKGROUND

In office or family life, in order to meet people's demand for coffee, they will buy coffee machines and make coffee through coffee machines; the existing coffee machines all have their own characteristics to meet the demand of making coffee with various flavors, including capsule coffee machines and drip coffee machines, among which the capsule coffee machines include a capsule funnel bracket for placing capsule coffee, and the drip coffee machines include a coffee powder hopper bracket for placing coffee powder.

In the existing coffee machine, compatible capsule coffee and coffee powder are used, and the capsule funnel and coffee powder hopper are set to be detachable. When in use, it is very inconvenient to disassemble and assemble the capsule funnel and coffee powder hopper continuously.

SUMMARY (I) Technical Problem to be Solved

The problem to be solved by this application is to provide a drip coffee machine compatible with coffee capsules, which can be compatible with the brewing of coffee powder and coffee capsules and meet the needs of users with different tastes; When brewing, the corresponding cavity can be selected by different keys to brew coffee, which is convenient to use.

(II) Technical Solution

In order to solve the technical problems, the present application provides a drip coffee machine compatible with coffee capsules, which includes a machine body and a machine cover, wherein a bracket assembly is arranged between the machine body and the machine cover, and the bracket assembly includes a first bracket and a second bracket; the first bracket is formed with a first cavity for placing coffee powder; the second bracket is formed with a second cavity for placing coffee capsules or coffee powder; the first cavity is communicated with the second cavity, and the second bracket is placed above the first bracket; a first key mechanism and a second key mechanism are arranged between the machine body and the machine cover, the first key mechanism is used for locking/releasing the machine cover, and the second key mechanism is used for locking/releasing the second bracket; after the machine cover and the second bracket are both opened, it is convenient to put the corresponding coffee material into the first cavity to brew the coffee liquid required by users, which is compatible with the brewing of coffee powder and coffee capsule, and meets the needs of users with different tastes; when brewing, the corresponding cavity can be selected by different keys to brew coffee, which is convenient to use.

Further, the first key mechanism includes a first key and the second key mechanism comprises a second key, and a linkage mechanism is arranged between the first key mechanism and the second key mechanism; when the first key is pressed, the machine cover is opened; when the second key is pressed, the second key synchronously drives the first key mechanism through the linkage mechanism to open the machine cover together with the second bracket.

Further, the first bracket is placed on the machine body, and the machine body is provided with an installation cavity for placing the first bracket, and the second bracket is hinged to the first bracket; a hinge joint of the first bracket and the second bracket is provided with a first torsion spring, the first bracket is provided with a through hole for communicating the first cavity and the second cavity; the second bracket is provided with a liquid outlet communicated with the second cavity to discharge brewed coffee liquid.

Further, the first key mechanism further includes a first fastener and a first slot movably engaged with the first fastener; the first fastener is slidably arranged on the machine body and the first slot is provided on the machine cover; a slidable first transmission part is arranged between the first key and the first fastener, and the first key drives the first fastener to disengage from the first slot through the first transmission part to release the machine cover, and the machine body is provided with a compression spring for driving the first fastener to slide to reset; the second key mechanism further comprises a second fastener and a second slot movably engaged with the second fastener, wherein the second fastener is slidably arranged on the machine body, and the second slot is arranged on the second bracket; a slidable second transmission part is arranged between the second key and the second fastener, and the second key drives the second fastener to disengage from the second slot through the second transmission part to release the second bracket.

Further, the first key and the second key are both horizontal sliding keys, and the machine body is provided with a control motherboard and a first microswitch electrically connected with the control motherboard; the first transmission part is provided with a protrusion for triggering a contact key of the first microswitch, and the protrusion is placed at one side close to the contact key; the machine body is provided with a second microswitch triggered by the second transmission part.

Further, the linkage mechanism comprises a first transmission block arranged on the first fastener and a second transmission block arranged on the second fastener, and the first transmission block abuts against one side of the second transmission block.

Further, a movement direction of the protrusion is perpendicular to that of the contact key, and a first inclined surface is formed on one side of the protrusion close to the contact key.

Further, the first transmission part is fixedly connected with the first key, second inclined plane is formed on the first transmission part, a third inclined plane corresponding to the second inclined plane is formed on the first fastener, and a sliding direction of the first key and a sliding direction of the first fastener are both parallel to the horizontal plane and perpendicular to each other.

(III) Beneficial Effects

The drip coffee machine compatible with coffee capsules can be compatible with the brewing of two coffee materials, namely coffee powder and coffee capsules, so as to meet the needs of users with different tastes; When brewing, the corresponding cavity can be selected by different keys to brew coffee, which is convenient to use; the machine body is provided with an installation cavity for placing the first bracket, which has a compact structure and occupies a small space; the bracket assembly is convenient to disassemble and assemble, and the bracket assembly is convenient to clean after disassembly; the first key is slid to trigger the first microswitch to transmit a signal to the control motherboard, and the first key is continuously slid to complete the release of the machine cover, so as to ensure that the correct signal is transmitted to the control motherboard before releasing the machine cover, ensure the correct operation of the program, and prevent the user from misoperation.

BRIEF DESCRIPTION OF DRAWINGS

In order to explain the technical scheme of this application more clearly, the drawings needed in the implementation will be briefly introduced below. Obviously, the drawings described below are only some implementations of this application. For those skilled in the art, other drawings can be obtained according to these drawings without creative work.

The corresponding component names of each reference sign in the figures are: 1 Machine body, 101 Installation cavity, 2 Machine cover, 202 First slot, 3 Bracket assembly, 301 First bracket, 302 Second bracket, 3021 Second slot, 303 First torsion spring, 304 Through hole, 40 Liquid outlet, 401 First cavity, 402 Second cavity, 4021 Filter basket, 4022 Capsule placing rack, 5 Compression spring, 6 First fastener, 61 First transmission block, 601 Third inclined plane, 7 Second fastener, 71 Second transmission block, 8 First key, 9 Second key, 10 First microswitch, 11 Contact key, 12 Protrusion, 121 First inclined plane, 14 Control motherboard, 15 Hot water outlet, 17 First transmission part, 1701 Second inclined surface, 19 Second transmission part, 20 Second microswitch.

DESCRIPTION OF EMBODIMENTS

In describing the preferred embodiments, specific terminology will be resorted to for the sake of clarity. It is to be understood that each specific term includes all technical equivalents which operate in a similar manner to accomplish a similar purpose.

While various aspects and features of certain embodiments have been summarized above, the following detailed description illustrates a few exemplary embodiments in further detail to enable one skilled in the art to practice such embodiments. Reference will now be made in detail to embodiments of the inventive concept, examples of which are illustrated in the accompanying drawings. The accompanying drawings are not necessarily drawn to scale. The described examples are provided for illustrative purposes and are not intended to limit the scope of the invention. It should be understood, however, that persons having ordinary skill in the art may practice the inventive concept without these specific details.

It will be understood that, although the terms first, second, etc. may be used herein to describe various elements, these elements should not be limited by these terms. These terms are only used to distinguish one element from another. For example, a first attachment could be termed a second attachment, and, similarly, a second attachment could be termed a first attachment, without departing from the scope of the inventive concept.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

As used in the description of the inventive concept and the appended claims, the singular forms "a," "an," and "the" are intended to include the plural forms as well, unless the context clearly indicates other.

Example 1

Referring to FIGS. 1-12, the first embodiment of the present application provides a drip coffee machine compatible with coffee capsules, which comprises a machine body 1 and a machine cover 2, wherein the machine cover 2 is hinged on the machine body 1 and can be turned on/off; a bracket assembly 3 is arranged between the machine body 1 and the machine cover 2, and the bracket assembly 3 includes a first bracket 301 and a second bracket 302; the first bracket 301 is formed with a first cavity 401 for placing coffee powder, and the second bracket 302 is formed with a second cavity 402 for placing coffee capsules or coffee powder; the machine cover 2 is provided with a hot water outlet 15 for discharging hot water to the second cavity 402; a filter basket 4021 or a capsule placing rack 4022 is placed in the second cavity 402; when coffee powder is selected for brewing coffee and the brewing amount is not large, the filter basket 4021 is placed in the second cavity 402, and then an appropriate amount of coffee powder is placed in the filter basket 4021 for brewing; when coffee capsules are selected, the capsule placing rack 4022 is placed in the second cavity 402, and then the coffee capsules are placed in the capsule placing rack 4022 for brewing; a second filter basket is placed in the first cavity 401 for dripping the brewed coffee powder; the first cavity 401 communicates with the second cavity 402, the second bracket 302 is placed above the first bracket 301, and a first key mechanism and a second key mechanism are arranged between the machine body 1 and the machine cover 2, wherein the first key mechanism is used for locking/releasing the machine cover 2, and the second key mechanism is used for locking/releasing the second bracket 302; after the machine cover 2 is opened, it is convenient for the user to put the corresponding coffee material into the second cavity 402; after the machine cover 2 and the second bracket 302 are both opened, it is convenient to put the corresponding coffee material into the first cavity 401 to brew the coffee liquid required by users; before brewing, the machine cover 2 is opened to put coffee capsules or coffee powder into the second cavity 402, or the machine cover 2 and the second bracket 302 are opened together to put coffee powder into the first cavity 401, the machine cover 2 is closed after the coffee material is put in, and the machine is started to make hot water flow out of the hot water outlet 15 for brewing; the machine can be compatible with the brewing of coffee powder and coffee capsule, and meet the needs of users with different tastes; when brewing, the corresponding cavity can be selected by different keys to brew coffee, which is convenient to use.

Figure 1:
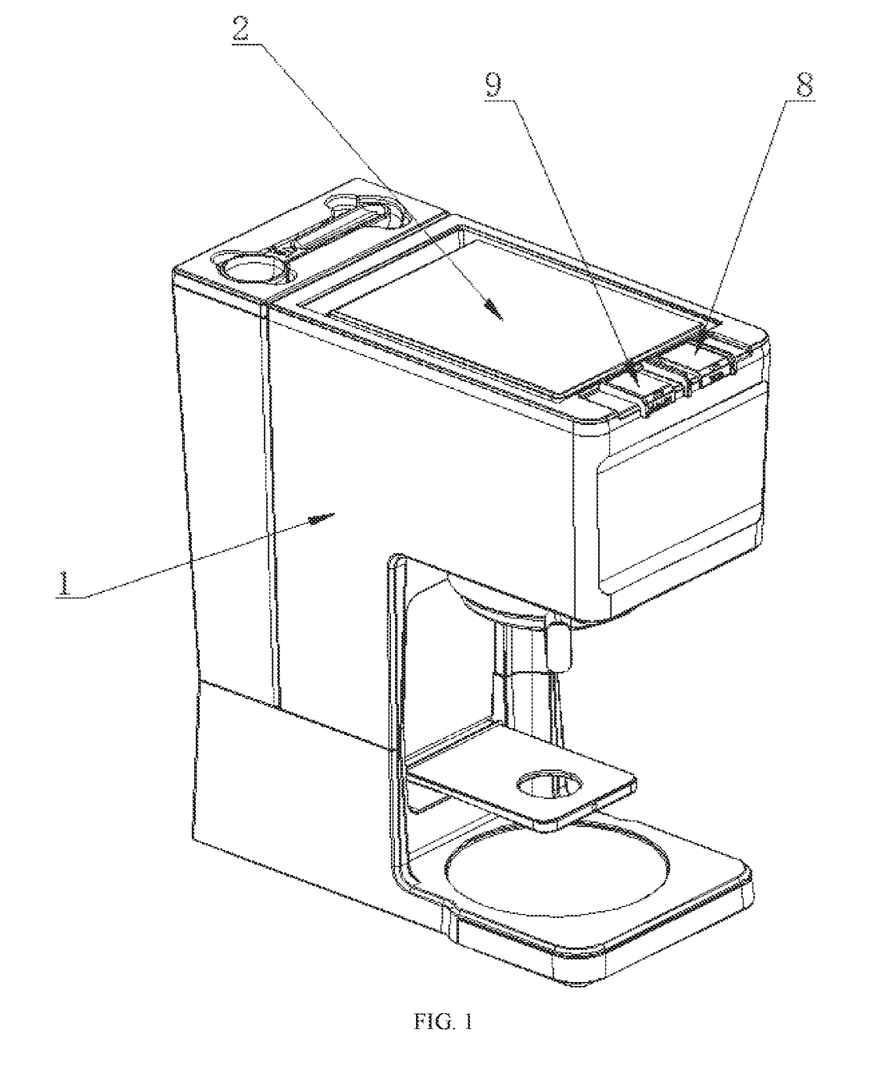
FIG. 1 is a perspective view of a drip coffee machine compatible with coffee capsules of the present application.
Figure 2:
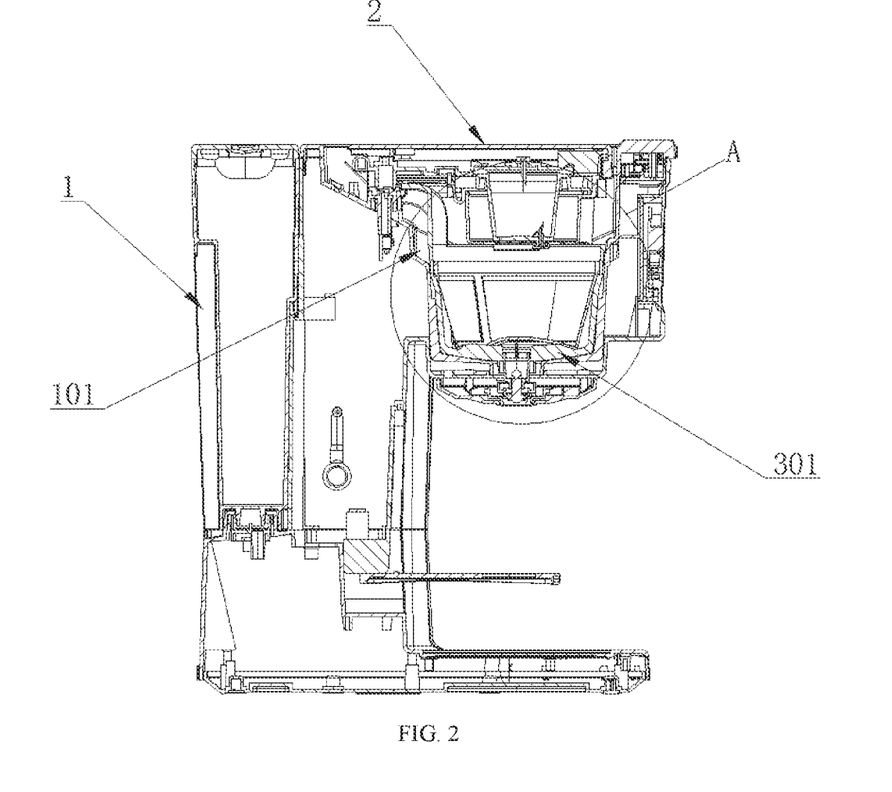
FIG. 2 is a sectional view of a drip coffee machine compatible with coffee capsules of the present application.
Figure 3:
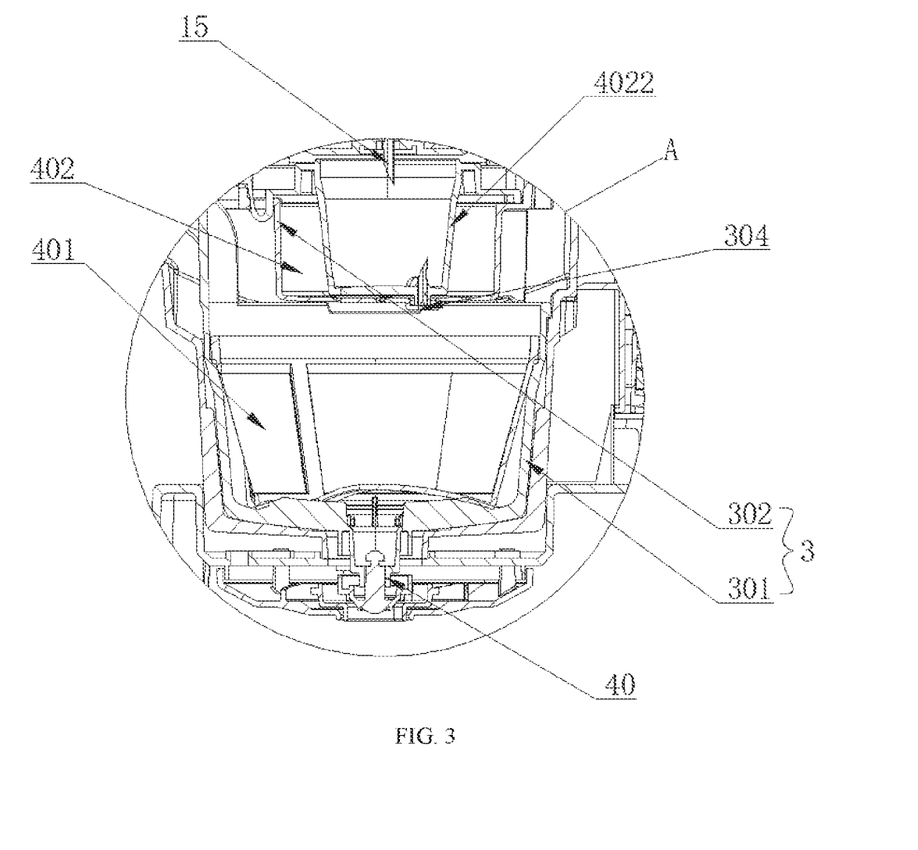
FIG. 3 is an enlarged view of part a in FIG. 2.
Figure 4:
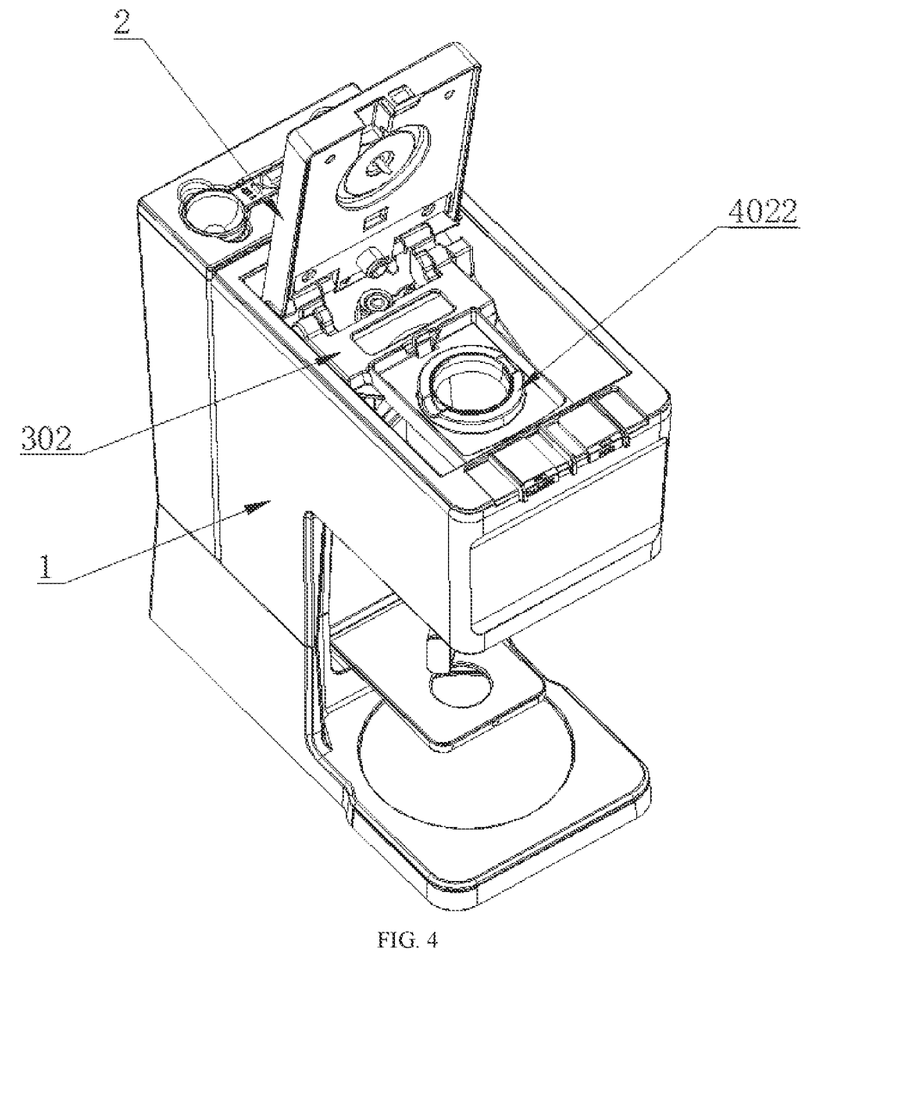
FIG. 4 is a schematic structural view of the machine cover of the drip coffee machine compatible with the coffee capsule of the present application after opening.
Figure 6:
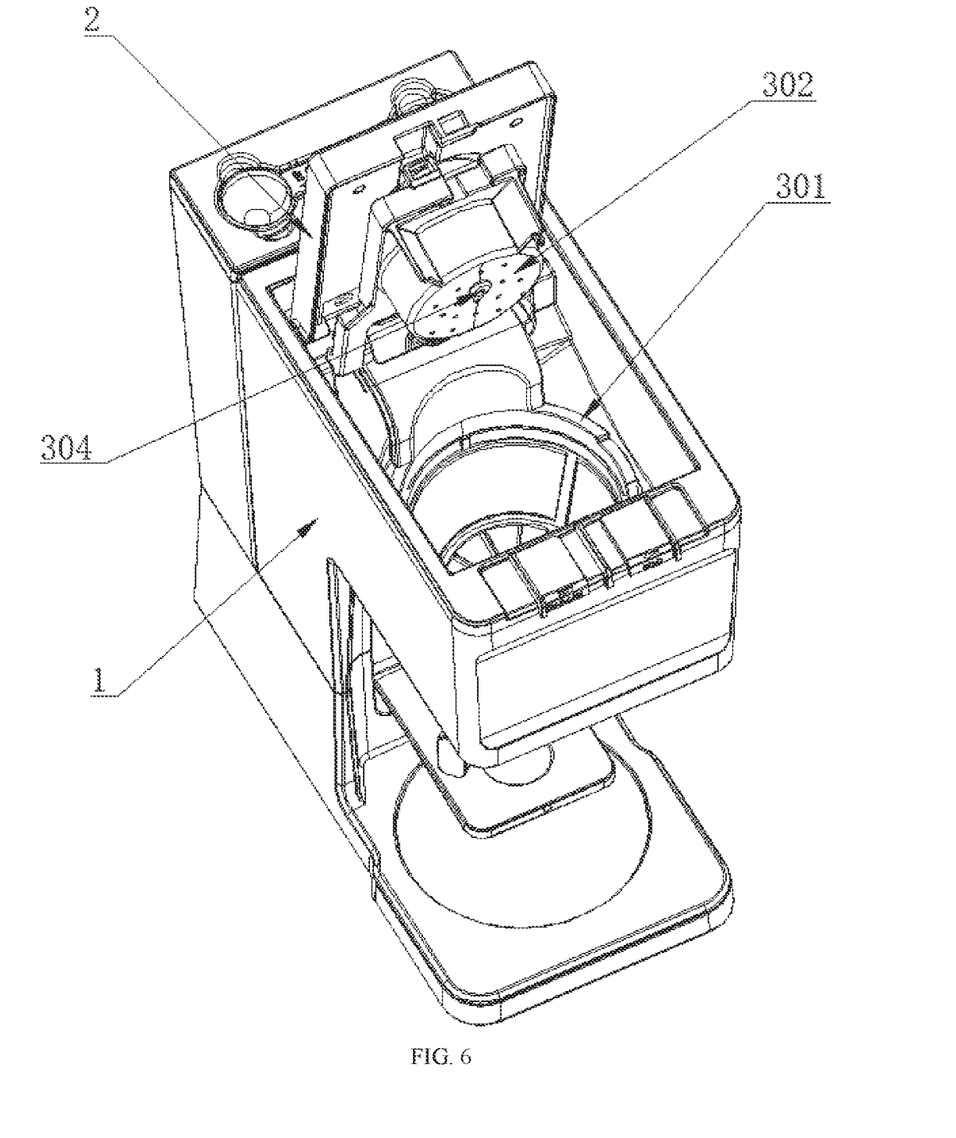
FIG. 6 is a schematic structural view of the machine cover and the second bracket of the drip coffee machine compatible with the coffee capsule of the present application after opening.
Figure 7:
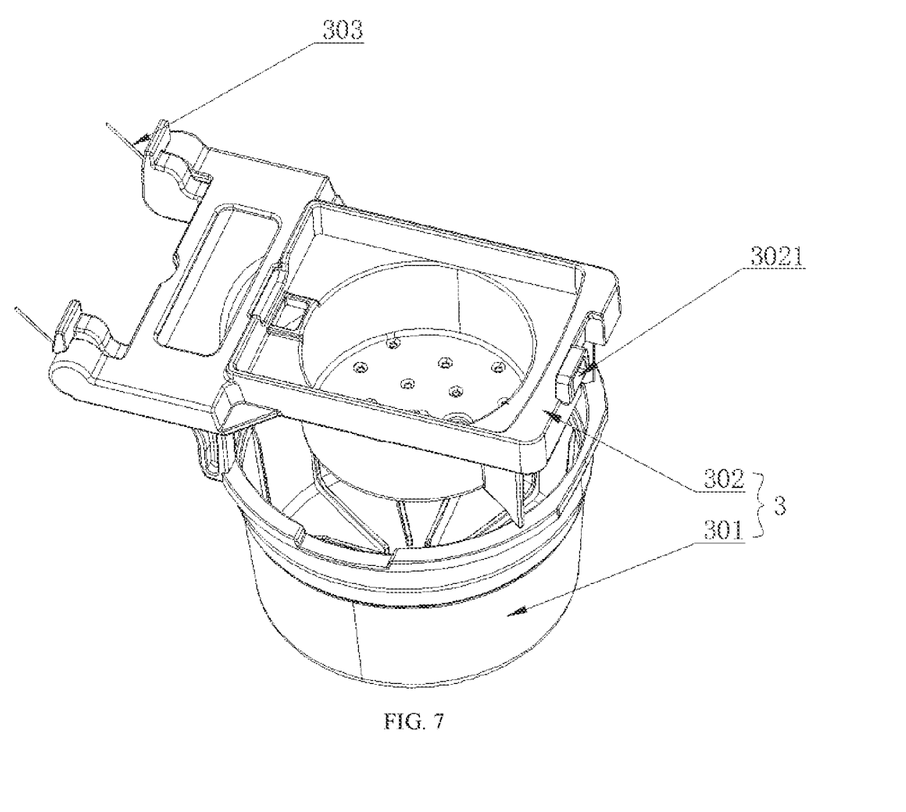
FIG. 7 is a structural schematic diagram of a bracket assembly of a drip coffee machine compatible with coffee capsules.
Figure 8:
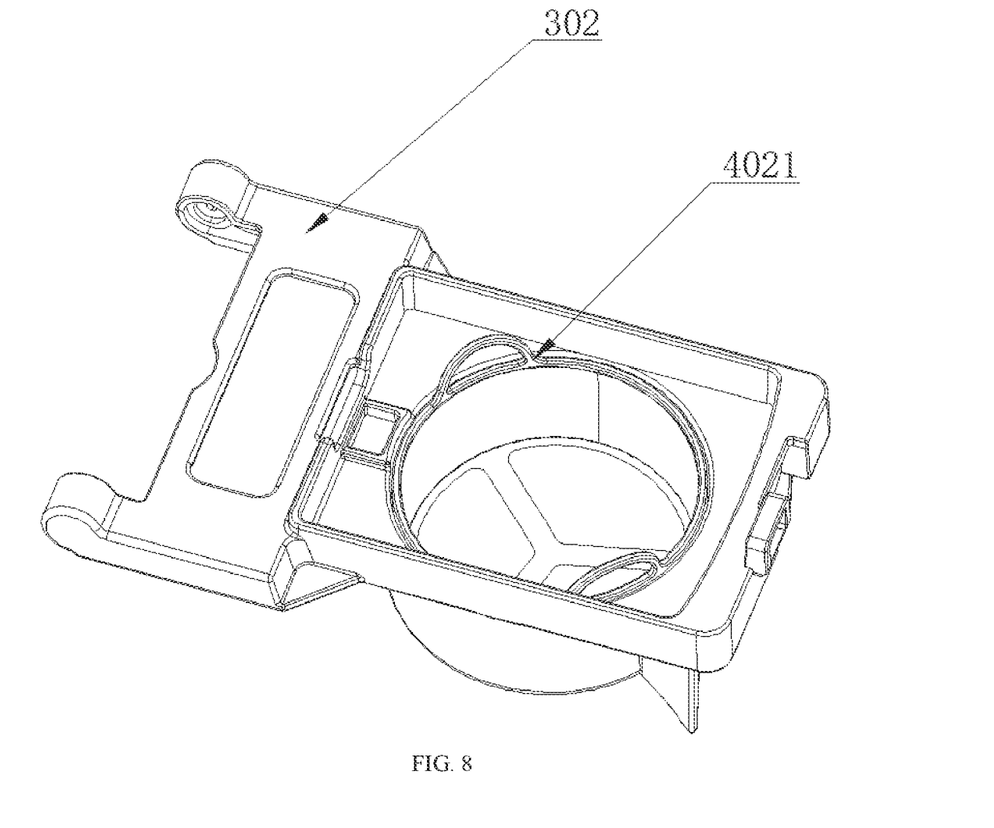
FIG. 8 is a schematic structural diagram of a filter basket of a drip coffee machine compatible with coffee capsules.

Referring to FIGS. 1, 4 and 6, the first key mechanism includes a first key 8, and the second key mechanism includes a second key 9. A linkage mechanism is arranged between the first key mechanism and the second key mechanism. When the first key 8 is pressed, the machine cover 2 is opened. When the second key 9 is pressed, the second key 9 synchronously drives the first key mechanism to act through the linkage mechanism, so that the machine cover 2 can be opened together with the second bracket 302, and the required coffee brewing cavity can be opened only by pressing one key at a time, which is convenient to operate.

Referring to FIGS. 2-7, the first bracket 301 is placed on the machine body 1, and the machine body 1 is provided with an installation cavity 101 for placing the first bracket 301, which is compact in structure and occupies little space. The second bracket 302 is hinged to the first bracket 301, so that the second bracket 302 can be turned on/off. The hinge joint of the first bracket 301 and the second bracket 302 is provided with a first torsion spring 303, so that the second bracket 302 can automatically turn over and open under the action of the first torsion spring 303, which is convenient to use. The first bracket 301 is provided with a through hole 304 for communicating the first cavity 401 and the second cavity 402, and the liquid in the second cavity 402 can flow into the first cavity 401 through the through hole 304. The second bracket 302 is provided with a liquid outlet 40 communicating with the second cavity 402 to discharge the brewed coffee liquid; the bracket assembly 3 is easy to disassemble and assemble, and it is easy to clean after disassembly.

Referring to FIGS. 5-11, the first key mechanism further comprises a first fastener 6 and a first slot 202 movably engaged with the first fastener 6, wherein the first fastener 6 is slidably arranged on the machine body 1, and the first slot 202 is arranged on the machine cover 2; a slidable first transmission part 17 is arranged between the first key 8 and the first fastener 6, and the first transmission part 17 is fixedly connected with the first key 8; the first key 8 drives the first fastener 6 out of the first slot 202 through the first transmission part 17 to release the machine cover 2, and the machine body 1 is provided with a compression spring 5 for driving the first fastener 6 to slide to reset; the second key mechanism also includes a second fastener 7 and a second slot 3021 movably engaged with the second fastener 7; the second fastener 7 is slidably arranged on the machine body 1, and the second slot 3021 is arranged on the second bracket 302; a slidable second transmission part 19 is arranged between the second key 9 and the second fastener 7, and the second transmission part 19 is fixedly connected with the second key 9; the second key 9 drives the second fastener 7 out of the second slot 3021 through the second transmission part 19 to release the second bracket 302; by pressing different keys, the corresponding cavity for brewing coffee can be opened, which is convenient to use.

Referring to FIGS. 9-12, both the first key 8 and the second key 9 are horizontal sliding keys. The machine body 1 is provided with a control motherboard 14 and a first microswitch 10 electrically connected with the control motherboard 14, and the control motherboard 14 is connected with a display panel and operation keys. The first transmission part 17 is provided with a protrusion 12 for triggering the contact key 11 of the first microswitch 10. After the contact key 11 is touched, it will send a signal to the control motherboard 14 to correctly start the running program of the function corresponding to the first key. The protrusion 12 is placed on the side close to the contact key 11. Because the microswitch 10 is sensitive, the first key 8 can drive the protrusion 12 to trigger h the contact key 11 in the early stage of the sliding process and continue to slide the first key 8 to drive the first fastener 6 to disengage from the first slot 202 to complete the release of the machine cover 2. The first key 8 is slid to trigger the first microswitch 10 first to transmit a signal to the control motherboard and continue to slide the first key 8 to release the machine cover 2, so as to ensure that the correct signal is transmitted to the control motherboard 14 before releasing the machine cover 2 and ensure the correct operation of the program and prevent the user from misoperation. The movement direction of the protrusion 12 is perpendicular to the movement direction of the contact key 11, and the protrusion 12 can press and touch the contact key 11 only by sliding a short stroke, and can continue to slide after touching the contact key 11, so that the first key 8 can continue to slide to release the machine cover 2; the machine body 1 is provided with a second microswitch 20 which is triggered by the second transmission part 19, and the second microswitch 20 is electrically connected with the control motherboard 14; the second key 9 is slid to drive the second transmission part 19, so as to trigger the second microswitch 20 to transmit a signal to the control motherboard 14, so as to make the coffee machine run according to the program corresponding to the second microswitch 20; it should be noted that the signals transmitted by the first microswitch 10 and the second microswitch 20 are different, and according to different signals, the coffee machine runs corresponding programs to brew corresponding coffee drinks; the second key 9 is slid to first trigger the second microswitch 20 to transmit a signal to the control motherboard 14, and the second key 9 is continuously slid to complete the release of the second bracket 302, so as to ensure that the correct signal is transmitted to the control motherboard 14 before releasing the second bracket 302, and ensure the correct operation of the program and prevent the user from misoperation.

Figure 5:
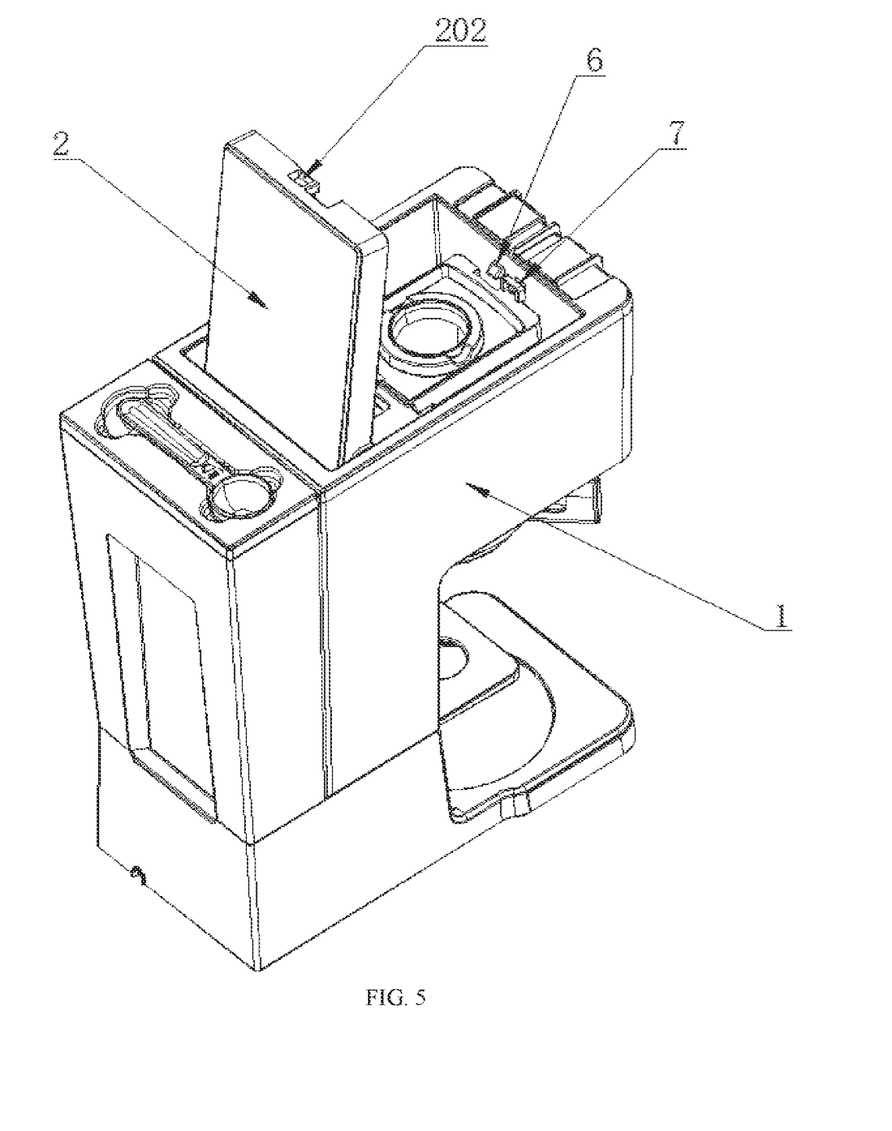
FIG. 5 is a schematic structural diagram of the first slot of the drip coffee machine compatible with coffee capsules.
Figure 9:
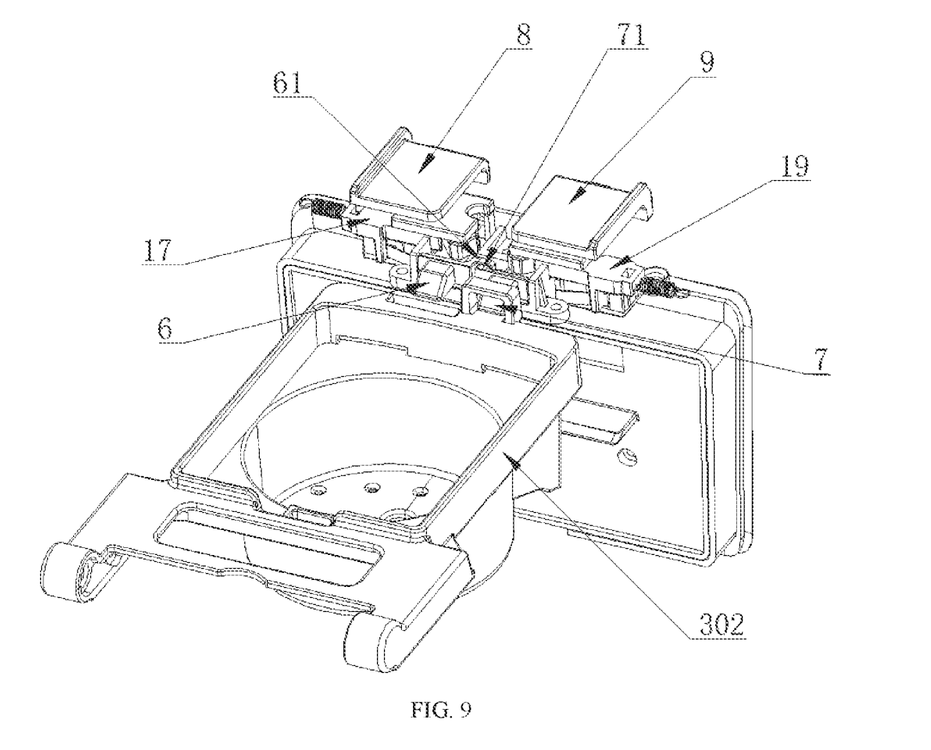
FIG. 9 is a schematic structural diagram of the first key mechanism of the drip coffee machine compatible with coffee capsules.
Figure 10:
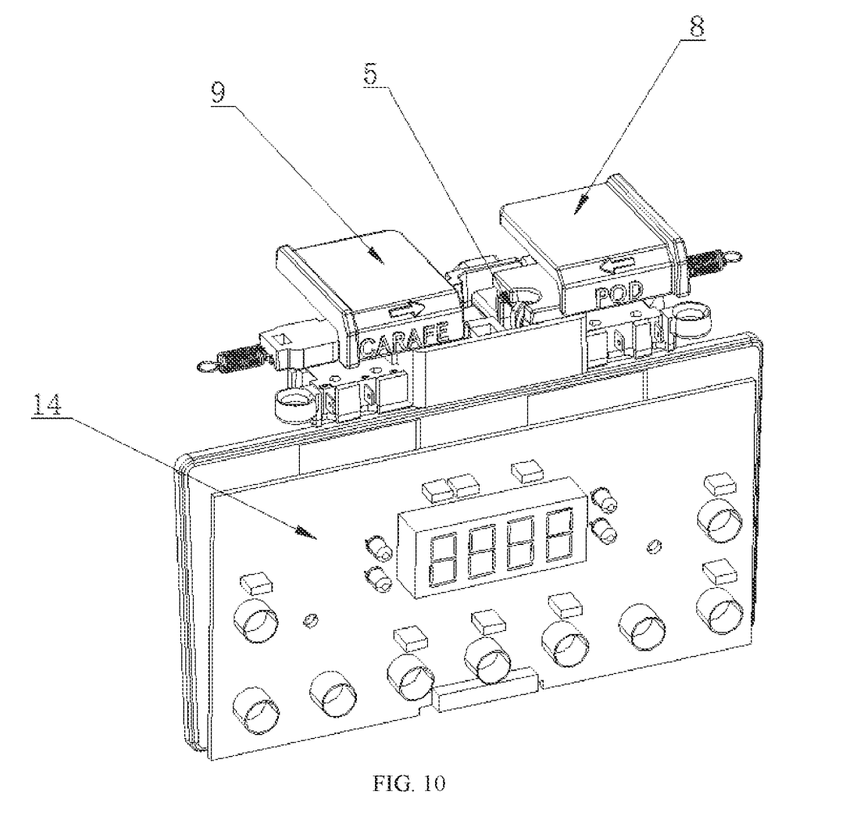
FIG. 10 is a schematic structural diagram of the control motherboard part of the drip coffee machine compatible with coffee capsules.
Figure 11:
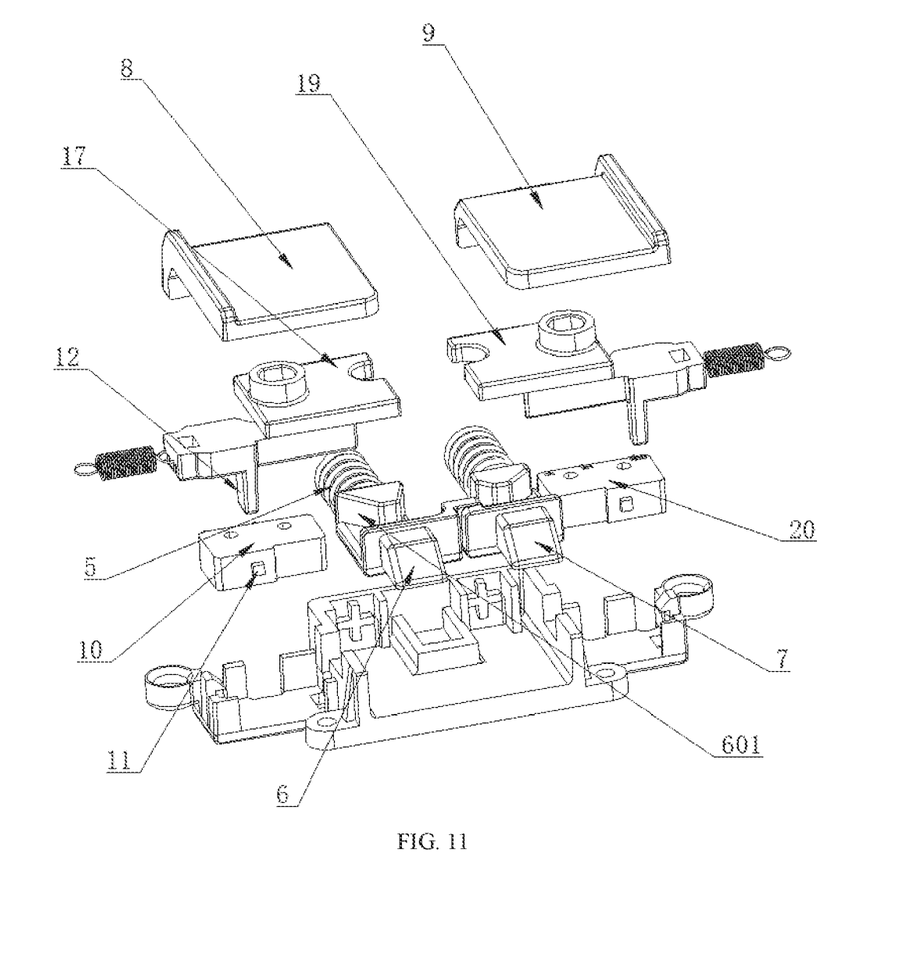
FIG. 11 is an exploded view of the first key mechanism and the second key mechanism of the drip coffee machine compatible with coffee capsules.
Figure 12:
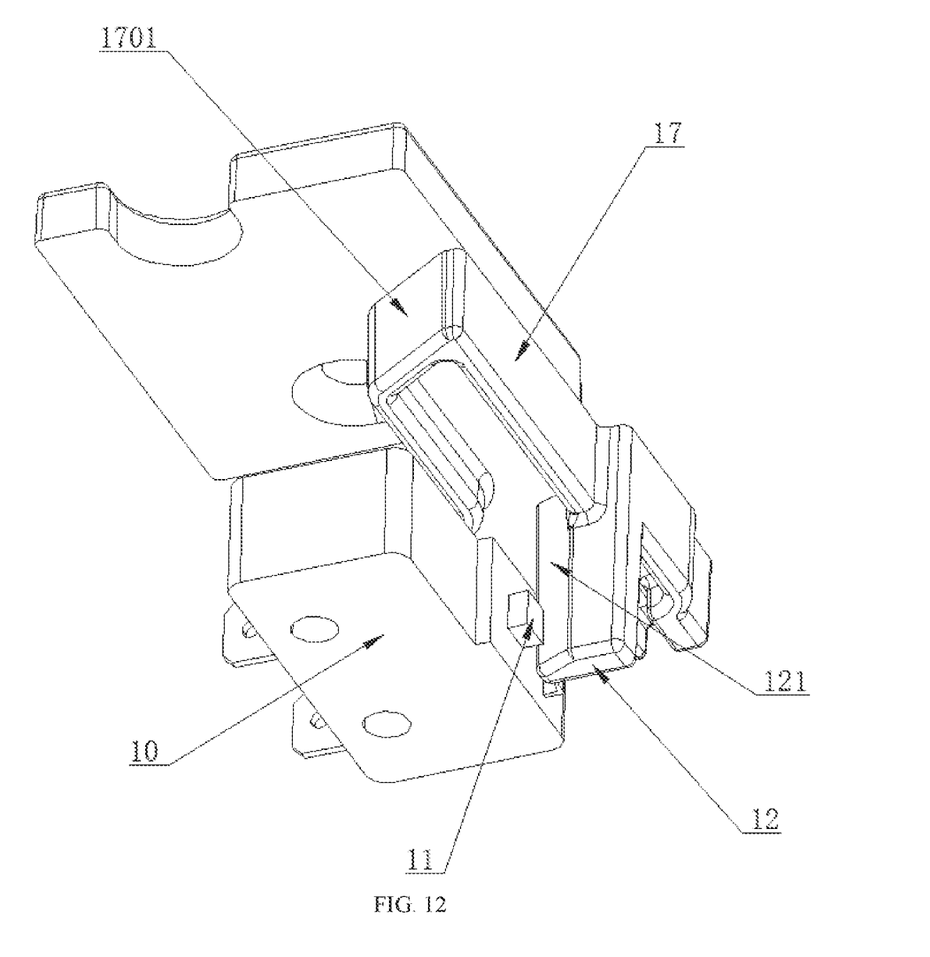
FIG. 12 is a schematic structural diagram of the first transmission part of the drip coffee machine compatible with coffee capsules.

Referring to FIGS. 5, 9 and 11, the linkage mechanism includes a first transmission block 61 arranged on the first fastener 6 and a second transmission block 71 arranged on the second fastener 7. The first transmission block 61 abuts against one side of the second transmission block 71, and when the second key 9 is pressed, the second fastener 7 can drive the first fastener 6 to move synchronously, so that the machine cover 2 can be opened together with the second bracket 302.

Referring to FIG. 9-FIG. 12, the movement direction of the protrusion 12 is perpendicular to the movement direction of the contact key 11. The protrusion 12 can press and touch the contact key 11 only by sliding for a short stroke, and the protrusion 12 can continue to slide after triggering the contact key 11, so that the first key 8 can continue to slide to release the machine cover 2. A first inclined surface 121 is formed on one side of the protrusion 12 near the contact key 11, which is convenient for the protrusion 12 to push the contact key 11 down through the first inclined surface 121 to complete the touching action. The first transmission part 17 is fixedly connected with the first key 8, a second inclined plane 1701 is formed on the first transmission part 17, and a third inclined plane 601 corresponding to the second inclined plane 1701 is formed on the first fastener 6, so that the first transmission part 17 drives the first fastener 6 to slide through the cooperation of the second inclined plane 1701 and the third inclined plane 601, and the sliding directions of the two are perpendicular to each other; the sliding direction of the first key 8 and the sliding direction of the first fastener 6 are both parallel to the horizontal plane and perpendicular to each other, and the first key 8 slides horizontally, so that the operation is simple and the sliding amount is more intuitive.

In the drip coffee machine compatible with coffee capsules, the first microswitch is triggered by sliding the first key to transmit a signal to the control motherboard, and the machine cover is released by sliding the first key continuously, so that the correct signal is transmitted to the control motherboard before the machine cover is released, and the correct operation of the program is ensured, and the misoperation of the user is prevented; the machine can be compatible with the brewing of coffee powder and coffee capsule, and meet the needs of users with different tastes; when brewing, the corresponding cavity can be selected by different keys to brew coffee, which is convenient to use; the machine body is provided with an installation cavity for placing the first bracket, which has a compact structure and occupies a small space; the bracket assembly is easy to disassemble and assemble, and it is easy to clean after disassembly.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

The invention has now been described in detail for the purposes of clarity and understanding. However, those skilled in the art will appreciate that certain changes and modifications may be practiced within the scope of the appended claims.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

We claim:

1. A drip coffee machine compatible with coffee capsules, comprising a machine body and a machine cover, wherein
    a bracket assembly is arranged between the machine body and the machine cover,
    the bracket assembly comprises a first bracket and a second bracket,
    the first bracket is formed with a first cavity for placing coffee powder,
    the second bracket is formed with a second cavity for placing coffee capsules or coffee powder,
    the first cavity communicates with the second cavity, and the second bracket is placed above the first bracket,
    a first key mechanism and a second key mechanism are arranged between the machine body and the machine cover, wherein
    the first key mechanism is used for locking/releasing the machine cover, and
    the second key mechanism is used for locking/releasing the second bracket.

2. The drip coffee machine compatible with the coffee capsules according to claim 1, wherein
    the first key mechanism comprises a first key and the second key mechanism comprises a second key,
    a linkage mechanism is arranged between the first key mechanism and the second key mechanism, and
    when the first key is pressed, the machine cover is opened and when the second key is pressed, the second key synchronously drives the first key mechanism through the linkage mechanism to open the machine cover together with the second bracket.

3. The drip coffee machine compatible with the coffee capsules according to claim 2, wherein
the first key mechanism further comprises a first fastener and a first slot movably engaged with the first fastener,
the first fastener is slidably arranged on the machine body and the first slot is provided on the machine cover,
a slidable first transmission part is arranged between the first key and the first fastener,
the first key drives the first fastener to disengage from the first slot through the first transmission part to release the machine cover,
the machine body is provided with a compression spring for driving the first fastener to slide to reset, and
the second key mechanism further comprises a second fastener and a second slot movably engaged with the second fastener, wherein
the second fastener is slidably arranged on the machine body, the second slot is arranged on the second bracket,
a slidable second transmission part is arranged between the second key and the second fastener, and
the second key drives the second fastener to disengage from the second slot through the second transmission part to release the second bracket.

4. The drip coffee machine compatible with the coffee capsules according to claim 3, wherein
the first key and the second key are both horizontal sliding keys,
the machine body is provided with a control motherboard and a first microswitch electrically connected with the control motherboard;
the first transmission part is provided with a protrusion for triggering a contact key of the first microswitch,
the protrusion is placed at one side close to the contact key; and
the machine body is provided with a second microswitch triggered by the second transmission part.

5. The drip coffee machine compatible with the coffee capsules according to claim 4, wherein a movement direction of the protrusion is perpendicular to that of the contact key, and a first inclined surface is formed on one side of the protrusion close to the contact key.

6. The drip coffee machine compatible with the coffee capsules according to claim 3, wherein the linkage mechanism comprises a first transmission block arranged on the first fastener and a second transmission block arranged on the second fastener, and the first transmission block abuts against one side of the second transmission block.

7. The drip coffee machine compatible with the coffee capsules according to claim 3, wherein
the first transmission part is fixedly connected with the first key,
a second inclined plane is formed on the first transmission part,
a third inclined plane corresponding to the second inclined plane is formed on the first fastener, and
a sliding direction of the first key and a sliding direction of the first fastener are both parallel to the horizontal plane and perpendicular to each other.

8. The drip coffee machine compatible with the coffee capsules according to claim 1, wherein
the first bracket is placed on the machine body,
the machine body is provided with an installation cavity for placing the first bracket,
the second bracket is hinged to the first bracket,
a hinge joint of the first bracket and the second bracket is provided with a first torsion spring,
the first bracket is provided with a through hole for communicating the first cavity and the second cavity, and
the second bracket is provided with a liquid outlet that communicates with the second cavity to discharge brewed coffee liquid.

\* \* \* \* \*